United States Patent [19]

Herr et al.

[11] 4,092,569

[45] May 30, 1978

[54] MULTIPLE ARMATURE PERMANENT MAGNET MOTOR/ACTUATORS

[75] Inventors: John Addison Herr, Garwood; Wolfgang Jaffe, Roselle Park, both of N.J.

[73] Assignee: The Singer Company, New York, N.Y.

[21] Appl. No.: 721,144

[22] Filed: Sep. 7, 1976

[51] Int. Cl.² .............................................. H02K 1/04
[52] U.S. Cl. ........................................ 318/35; 318/37; 318/127; 310/154; 310/112; 310/126
[58] Field of Search ....................... 310/154, 112, 126; 318/35, 37, 127

[56] References Cited

U.S. PATENT DOCUMENTS

| 3,471,729 | 10/1969 | Latta et al. ............................. 310/112 |
| 3,588,656 | 6/1971 | Shofner ................................. 318/282 |
| 3,651,355 | 3/1972 | Mason ................................... 310/112 |
| 3,891,876 | 6/1975 | Herr et al. .......................... 310/154 X |

*Primary Examiner*—Robert K. Schaefer
*Assistant Examiner*—John J. Feldhaus
*Attorney, Agent, or Firm*—Robert E. Smith; Edward L. Bell; Julian Falk

[57] ABSTRACT

This disclosure relates to electric motor/actuators and in particular to an electric motor/actuator including multiple non-magnetic armatures having commutated windings rotatable in a single air gap formed between opposing permanent magnets having their opposed polarized poles facing said armatures and wherein individual ones of said armatures are capable of different output functions from others of said armatures.

8 Claims, 5 Drawing Figures

MULTIPLE ARMATURE PERMANENT MAGNET MOTOR/ACTUATORS

BACKGROUND OF THE INVENTION

This invention relates to permanent magnet D.C. motors and actuators of the type having non-magnetic armatures disposed within a single air gap formed by peripherally mounted permanent magnets having oppositely polarized pole faces facing the axis of the armatures. Such motors, as disclosed in U.S. Pat. No. 3,891,876 issued June 24, 1975 and assigned to the same assignee as the present invention, are characterized as being relatively small in size, light in weight and having a high torque-to-inertia ratio, long brush life and freedom from inherent electromagnetic interference (EMI). Multiple armature permanent magnet motors are known in the art but are characterized as having poor torque-to-inertia ratios as well as large armature inductance which contributes to poor commutation and inherently large EMI. Further, because such motors are constructed with armatures having iron laminations and a relatively small air gap it is difficult to avoid coupling between adjacent armature windings and when using two or more armatures it is preferable to support each armature in a magnetic path substantially isolated from the magnetic path of any other armature.

GENERAL DESCRIPTION OF THE INVENTION

In accordance with one form of the present invention a motor/actuator is provided which comprises a plurality of solid non-magnetic armatures disposed between opposed permanent magnets defining a single air gap therebetween in which the solid non-magnetic armatures are disposed. Preferably the permanent magnets are of the rare-earth-alloy type, which are sometimes sold under the trade name "Lanthanet". For purposes of the present invention the term "air gap" will be defined as "A non-magnetic discontinunity in a ferromagnetic circuit" (see Modern Dictionary of Electronics, published 1970, by Bobbs-Merrill Company, Inc.). By using such rare-earth type magnets it is possible to dispose solid non-magnetic armatures, each securely mounted on a respective single shaft and journaled for rotation at both ends, in a single air gap large enough to contain said armatures. The armatures are sufficiently large to contain peripheral slots in which windings may be placed. Sufficient air gap flux is provided by the high coercive force of the rare-earth-alloy magnets in spite of the large air gap to provide practical D.C. motors which are characterized in their relatively small size, low weight and high torque-to-inertia ratios. Further, in that the armatures are non-magnetic, more than one armature can be placed in a common magnetic path generated by the opposed permanent magnets without any problem of coupling between adjacent windings. Thus a pair of such permanent magnets may be used to generate a common flux field for more than one non-magnetic armature. Further, because of the aforementioned characteristics of such a motor and in particular the high torque-to-inertia ratio of such motors, each armature may be separately controlled by controlling the current conduction to each armature winding of each respective armature to thereby vary the function or output of each armature without effecting the function or output of any other armature. Therefore, for example, a single motor of the type of the present invention may be used in an environment such as a sewing machine for controlling a multitude of functions such as rotary motion for the main shaft and hook shaft, reciprocating motion for the feed dog used in feeding the fabric through the machine, and reciprocating motion for the bight mechanism which controls the lateral position of the needle during successive penetrations thereof. These and other advantages of the invention will be best understood upon reading the following detailed description of the invention with the accompanying drawings as described herein below.

DETAILED DESCRIPTION OF THE INVENTION

Figure 1:
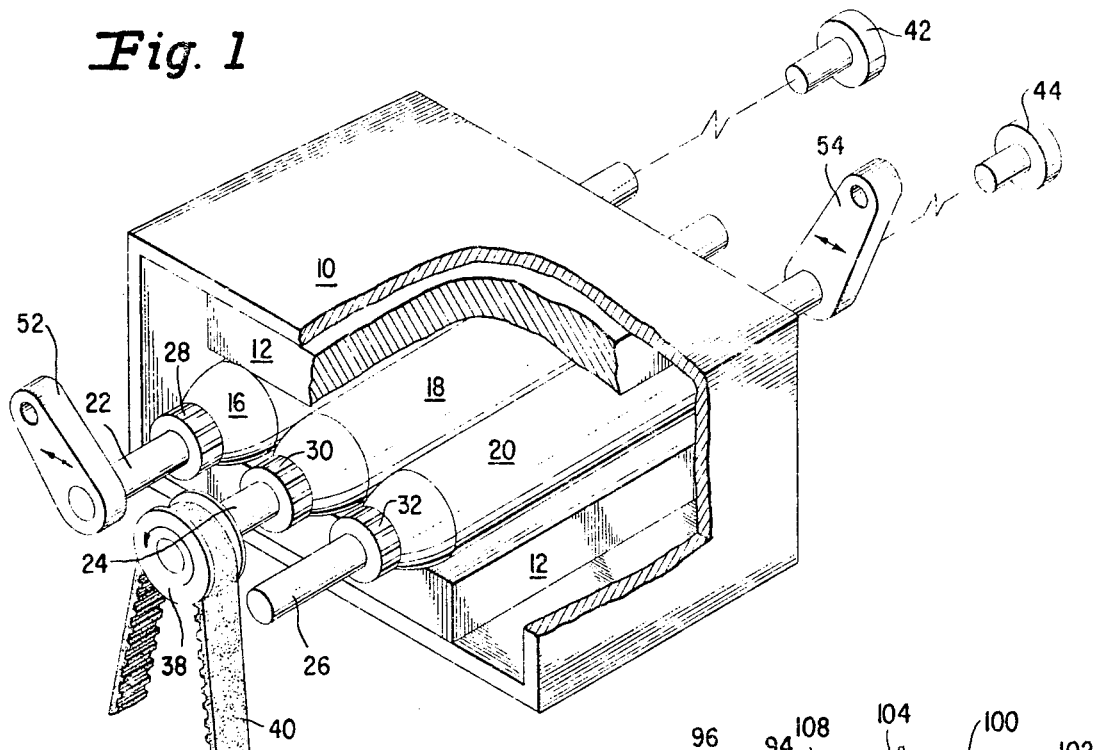
FIG. 1 is a perspective view of the motor/actuator of the invention with a portion thereof cut-away to illustrate its construction.

Referring to the drawings, there is shown in FIG. 1 thereof a motor/actuator, hereinafter referred to as a motor, having a frame 10 made of magnetically permeable material. Secured to oppositely facing inner surfaces of the frame 10 are block-shaped permanent magnets 12 which magnets 12—12 are preferably made of rare-earth cobalt alloys and may be of the type sold under the trade name "Lanthanet". The magnets 12 are magnetized across the small dimension thereof and when assembled into the motor frame 10 are disposed such that there inner faces present preferably flat poles of opposite polarity, as shown by Letters N, S in FIG. 2, and form the single working air gap for the motor. This type of magnet formed in the manner illustrated in the drawings results in a flat pole face structure which provides uniform flux density in the working gap. It will be understood that the frame 10 functions as a low reluctance return path for the flux supplied by the magnets 12—12 and produces in the air gap between the poles N-S a working flux field of high flux density due to the large coercive force of the magnets 12—12.

Figure 2:
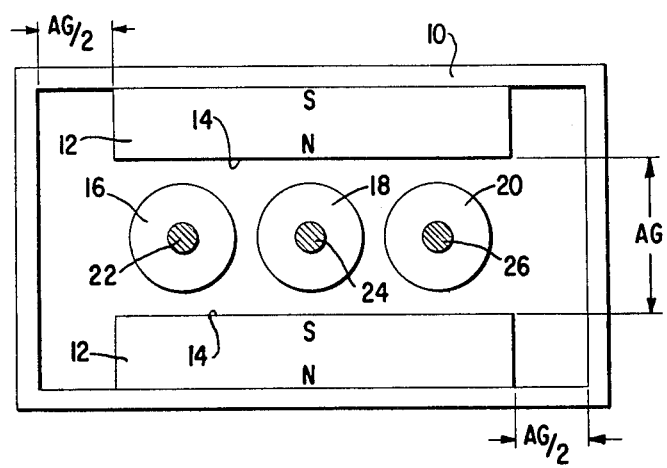
FIG. 2 is a front plan view of the motor/actuator of the invention.

Referring to FIG. 2, a plurality of solid, non-magnetic, cylindrical armatures 16, 18, and 20 are disposed between the magnets 12—12 within the confines thereof and in the air gap identified as A G. As further seen in FIG. 2, the magnets 12—12 and armatures 16-20 occupy a space less than the lateral width of the frame 10 to leave spaces therebetween at each end thereof, which spaces are preferably no less than one-half the dimension of the air gap, as identified at AG/2 in said FIG. 2. This spacing serves to insure flux flow through the single air gap only without any adverse effect from the end portions of the frame 10. While the armatures 16-20 may be made of any non-magnetic material, it is preferable to employ a light weight molded plastic insulating material with rotor shafts 22, 24, and 26 molded intergal with each of the respective armatures 16-20. These rotor shafts 22-26 are journaled for rotation in suitable bearing means located at one end of the frame 10 (not shown) and at the other end in a brush plate (not shown). The mounting of the rotor shafts in bearings and in a brush plate may be carried out by any suitable means and does not provide a part of the present invention per se. Reference may be made to the aforementioned U.S. Pat. No. 3,891,876, for a disclosure of such mountings. It is sufficient to say for purposes of the present invention that such supporting structure provides rigid positional stability for the armatures within the air gap and affords maximum torque transmission to the rotor shafts.

As disclosed in U.S. Pat. No. 3,891,876, the armature in this type of motor is formed with longitudinal peripherally shaped slots in which are located windings connected in a conventional manner to commutators such as those shown at 28, 30 and 32 in FIG. 1. Brushes (not shown) are also provided which bear against the commutators and provide current conduction to the armature windings from an external voltage source in a manner well known in the art. Since in this type of armature, the armature itself is already formed from electrically insulating material, there is no need for separate slot insulation so that entire slot space can be more efficiently utilized to contain the armature windings and results in desireably more copper per slot then would be the case with the conventional iron armature with separate slot insulation. Since, as stated above, the armatures 16–20 contain no magnetic material, except for possibly the shafts 22–26, which if necessary can be made of non-magnetic material, exert little or no influence on the distribution of the flux in the air gap and therefore, the magnets 12—12 can be most simply formed with flat poles and the air gap flux density will be desireably uniform. This results in a structure in which the armatures have a diameter and length commensurate with the dimensions of the permanent magnets taken transversly of the direction of magnetization. Further, the armature reaction magnetomotive force due to the armature current acts substantially at right angles to the field flux axis. Thus, the return path for the armature reaction flux is largely through air and transversely to the magnets 12—12 which have substantially the same low permeability as air, being rare-earth alloy materials, resulting in a high reluctance and a low flux. The return path for the field flux is through the frame 10 which is of high permeability resulting in low reluctance and high flux. This combination of high field flux and low armature reaction flux is highly desirable and results in substantially no distortion of the air gap flux due to armature current. The commutation therefore is not adversly effected by changes in load as is conventional in prior art motors. Furthermore there is substantially no demagnetization effect on the permanent magnets due to armature current which is important to the long term stability of the motor characteristics.

Due to the characteristics of this type of motor, as discussed above, it has been found possible to provide a plurality of armatures such as that illustrated at 16–20, although not limited to this amount, and to obtain from each said armature substantially the same results as was obtained in the use of a single armature in the presence of a single pair of opposing magnets as described above. It has been further found, that each of the armatures 16–20 can be individually controlled by controlling the external voltage source provided to each armature winding of each of the armatures 16–20. For example, referring to FIGS. 1 and 3, a voltage source "V" is provided and is connected to an integrated circuit (I.C.) module 33 for supplying discrete input control signals to each of the armatures 16–20. Lines 34–34' are directly connected from the I.C. 33 to the armature 18 through its commutator 30 to initiate rotary motion of said armature and a pulley 38 may be connected to one end of the rotor shaft 24 of the armature 18 which in turn is connected with a timing belt 40 for imparting timed rotary motion to a component of a machine or the like.

Figure 3:
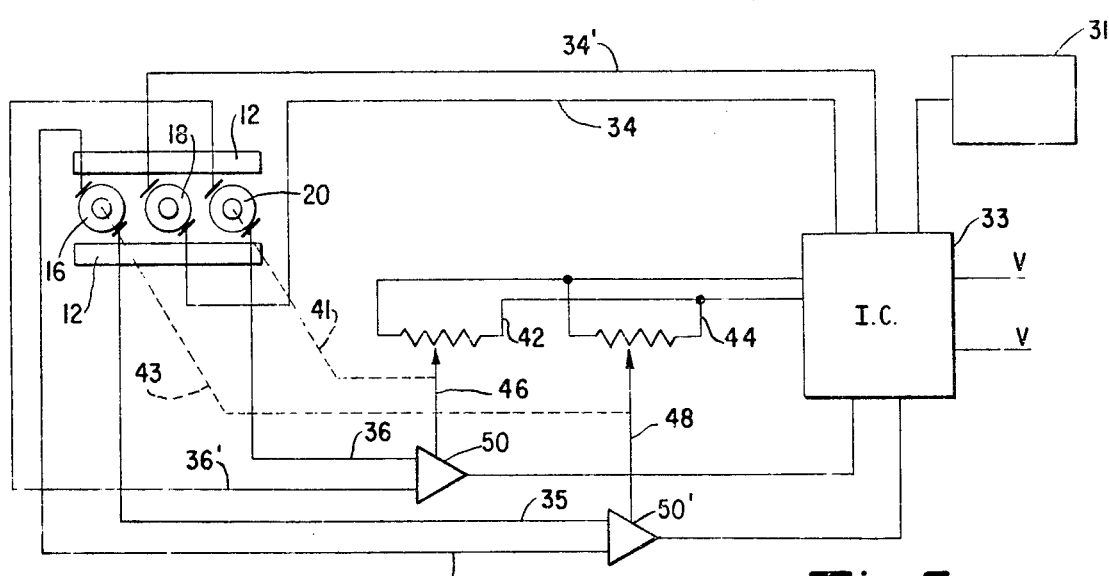
FIG. 3 is a schematic of a control circuit which may be used with the motor/actuator of the invention.

With further reference to FIG. 3, a schematic of a control circuit is shown therein by way of example which may be used with the motor of the invention. An integrated circuit (I.C.) module 33 is shown therein as having inputs "V" on one side thereof which may originate as A.C. voltage signals derived as the output of a counter and/or pulse generator 3 or the like. The I.C. module 33, either of the read-only type or random access type, may include a memory and appropriate logic circuitry for producing as its output individual control signals to each of lines 34–34' 35–35' and 36–36' connected to a respective commutated armature 16, 18, and 20. It will be apparent that the I.C. module 33 may be constructed so as to output a wide variety of individual control signals. As will be further described below with reference to FIG. 4, also by way of example, the control signals to armatures 16 and 20 may be of timed, continually reversing polarity to bring about rapid reversal in direction of rotation of said armatures for producing an oscillation output thereof, while the control signal to the armature 18 may result in producing only continuous rotary motion. Because of the novel low inertia and high acceleration characteristics of the motor of the invention which permits rapid changes in direction of the armatures, the individual armatures of the motor are each readily controllable and a variety of combinations of outputs may be obtained therefrom. It will be apparent that, the I.C. module may be programmed for producing different types and combinations of input signals for each armature of the motor, as for example, by varying the polarity, timing of changes in polarity, speed, on-off timing, etc.

Each of the armatures 16 and 20 has a potentiometer 42 and 44, respectively, physically connected thereto, as illustrated by lines 41 and 43 in FIG. 3, which potentiometers physically measure the positional movement of the rotor shafts 22 and 26 of said armatures 16 and 20 respectively. The potentiometers 42 and 44 provide position signals which are balanced against a fix voltage source to provide an output signal on lines 46 and 48 connected to each potentiometer 42 and 44 respectively which output signal is carried by said lines 46 and 48 to amplifiers 50–50' for providing a modified and amplified signal as an input voltage to the respective commutator 28 or 32 on armatures 16 and 20. Thus by preadjustment of the potentiometers 42 and 44 the input signals to the armatures 16 and 20 will be modified by the feedback signals determined by the position of the potentiometers with respect to the desired position of the armatures so that the extent of movement of said armature will be controlled within desired prescribed limits. As described above, in one example of the motor disclosed herein, the input signals to the armatures 16 and 20 may be controlled so that the output motion of these armatures is an oscillating motion which is accomplished by continually reversing the polarity of the input signal. This is possible in this type of motor due to its above described characteristics including low inertia, high acceleration, which permits for rapid reversal of direction of motion of the armatures. The oscillating motion of the armatures 16 and 20 may be directed to elements of machinery which require reciprocating motion as for example by physically connecting to the rotor shafts 22 and 26 link members 52 and 54 which may be in turn connected through appropriate linkage to the reciprocating mechanism of the machinery. Alternatively, the shafts 22 and 26 may be connected to gears for providing a reduction in speed or the like and then to the reciprocating mechanism of the machine.

Figure 4:
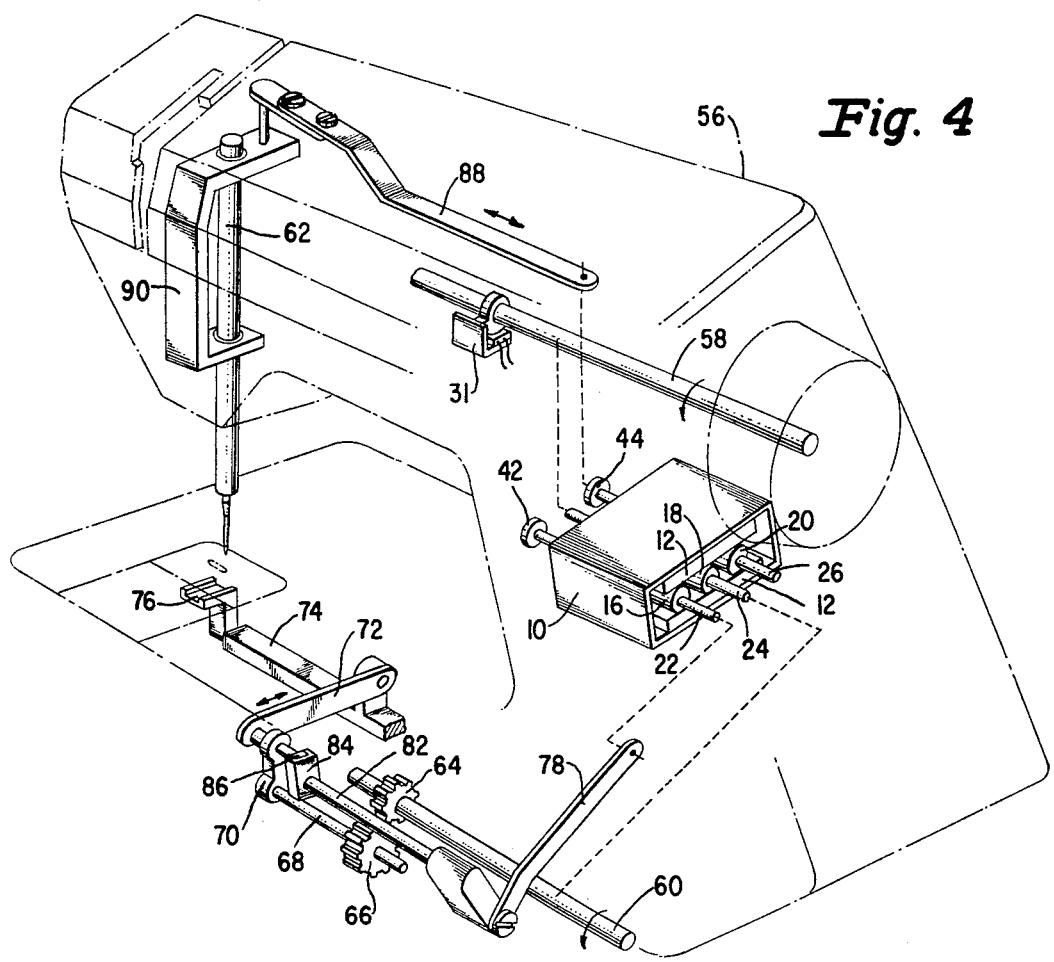
FIG. 4 is a perspective view of a sewing machine partially in phantom illustrating a motor/actuator of the type of the present invention contained therein for controlling the various functions of said machine.

Referring to FIG. 4, there is shown therein an example of such utilization of the motor of the invention in a sewing machine which may be of the type used in so-called household sewing operations. The sewing machine illustrated therein comprises, in general, a frame 56 shown in phantom in which is supported in the usual manner a main shaft 58. Typically, in a sewing machine the main shaft 58 has a motion which is purely rotary as well as is the motion of the bed shaft 60 located in the bed portion of the sewing machine frame 56. A pulse generator 31 may be connected to the main shaft 58 for producing timed pulses, as through a Hall Generator or the like and a rotating magnetic segment, which timed pulses are produced in accordance in the cycle of operation of the machine to thereby deliver such timed pulses to the I.C. 33 such that its output will be appropriately timed with the machine. As illustrated in dotted lines in FIG. 4, the rotor shaft 24 of armature 18, which as described above as having purely a rotary motion, may be connected by suitable linkage to the rotary shafts 58 and 60. The rotary shaft or main shaft 58 is connected in a usual manner to a needle mechanism generally designated at 62 through a crank mechanism, (not shown) for imparting a reciprocating motion to the needle mechanism 62 in order to penetrate the fabric with a thread for imparting stitches thereto. The bed shaft 60 is connected to a hook mechanism (not shown) for concatenating the thread carried by the needle with a bobbin thread in forming lock stitches as is well known in the sewing art. The bed shaft 60, through gears 64 and 66, shaft 68, pitman 70, link 72 and link 74, imparts a reciprocatory motion to a feed dog 76 which is used to feed a fabric across the surface of the sewing machine also in a known manner. A feed regulator mechanism is also part of the feed mechanism for controlling the length of travel of the feed dog 76 in feeding the material through the machine. Such mechanism normally is driven in a reciprocatory manner through a link 78, a rock arm 80 connected to a rock shaft 82 which carries a slotted feed regulating guideway 84 in which is mounted a cam 86 carried by pitman 70 and disposed in sliding relationship with the guideway 84. Thus the link arm 78 in its reciprocating motion imparts a rocking motion to the guideway 84 and determines through the inclination of guideway 84 the extent of throw or the length of travel of a feed dog 76. This regulatory mechanism in itself is well known in the sewing art and forms no part of the present invention.

A second reciprocatory mechanism carried by the sewing machine is in the form of a bight control mechanism or lateral positioning mechanism for the needle. This bight control mechanism includes an elongated control arm 88 which normally moves in a back and forth or reciprocatory movement. The arm 88 is pivotally connected to a bight control gate member 90 in such a manner as to impart a lateral to and fro movement to the needle and thereby control the lateral position of needle penetration with respect to the line of fabric feed. Therefore it will be seen that there are two important reciprocating type mechanism in the sewing machine as well as mechanism that require purely rotary motion. As seen further in FIG. 4, the motor of the invention is supported within the frame 56 of the machine with the rotor shafts 22 and 26 connected to the feed mechanism and the bight mechanism, respectively. The rotor shaft 24 as mentioned above is connected to the main shaft 58 and the bed shaft 60 to impart purely rotary motion thereto. As previously described, input signals may be provided to the armatures 16 and 20 which signals are continually changing polarity for reversing said armatures in a cyclical fashion. Potentiometers 42 and 44 physically sense the position of the armatures to modify these input signals so as to accurately position the armatures and thereby provide relatively accurate oscillating output motion to the shafts 22 and 26 of the armatures 16 and 20. The aforesaid armatures 16 and 20 may be connected through their shafts 22 and 26 by suitable linkage illustrated by the dotted lines in FIG. 4 to impart the respective oscillating motion thereof to the bight mechanism and the feed mechanism described above. It will be apparent, however, that a sewing machine is only illustrative of one type of mechanism to which a motor of the type of this invention may be applied. For purposes of description all three armatures 16, 18, and 20 have been referred to as motor armatures but it will be understood that armatures 16 and 20 may also be referred to as actuators.

Figure 5:
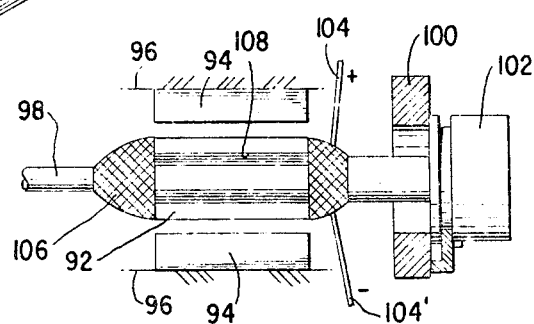
FIG. 5 is a side view of a single actuator illustrating another embodiment of the invention.

Referring to FIG. 5, another embodiment is shown used solely as an actuator and comprises a single non-magnetic armature 92 illustrated therein as being supported in a single air gap, as described above, between two permanent magnets 94—94, being of the same type as magnets 12—12. The magnets are secured to the inner surface of a magnetically permeable frame structure 96, which may be similar to that described above. The armature 92 is preferably made from light weight plastic and is molded integrally with a rotor shaft 98. The shaft 98 is supported by a bearing frame structure 100 at one end thereof and by a suitable bearing (not shown) at its other end. A potentiometer 102 is fixed to one end of shaft 98 for rotation therewith and physically senses the shaft position as described above. Instead of providing a commutator, leads 104–104' are directly connected to the windings 106 disposed in slots 108 provided in the armature 92. As indicted in FIG. 5, one lead 104 may supply a plus voltage and line 104' a minus voltage. Be periodically reversing the polarity of the input voltage to the windings 106, as through signals from I.C. 33, the armature 92 may be caused to substantially instantaneously reverse its direction of rotation. This is possible due to the low inertia characteristics of this type of actuator. Thus, the actuator illustrated in FIG. 5 may be used as a rotary actuator which may be coupled directly to a reciprocating mechanism of a machine or the like. For example, an actuator mechanism having two such armatures and constructed as described in FIG. 5, may be substituted for the commutated armatures 16 and 20 in FIG. 4. By using proper control signals as from I.C. 33, for example, the armature 68 may be caused to rapidly reverse in direction or rotated in either direction and stopped at a zero rotation position from either direction of rotation. The potentiometer 102, as in the circuit of FIG. 3, may be used to feedback position signals to accurately locate the armature 92. It will be apparent, that the motor/actuator of this invention provides for a relatively small and compact structure and is capable in and of itself of providing a variety of multiple output functions some of which may be characterized as in the nature of those performed by an electric motor or an electromagnetic actuator.

While the invention has been described in its preferred embodiment, it will be obvious to those skilled in the art that various changes and modifications can be made without departing from the spirit and scope thereof as defined in the appended claims.

Having thus set forth the nature of this invnetion what we heretofor claim is:

1. An electric motor having a frame of magnetic material, said frame including opposed top and bottom walls, permanent magnet means secured to the inner peripheral surface of said walls in opposing polar relationship and defining a single air gap therebetween, and a plurality of solid non-magnetic armatures disposed within said single air gap and within the confines of said opposed top and bottom walls.

2. An electric motor as recited in claim 1 wherein said frame includes a pair of opposing side walls and said magnet means terminating short of the length of said top and bottom walls to thereby leave a gap between said magnet means and said side walls.

3. An electric motor as recited in claim 2 wherein the gap defined between said magnet means and said side walls is equal to at least one half the distance of said single air gap.

4. An electric motor as recited in claim 1 wherein each of said solid non-magnetic armatures is provided with commutated windings.

5. An electric motor as recited in claim 1 wherein said permanent magnet means are formed from rare-earth alloys.

6. An electric motor as recited in claim 1 wherein at least one of said armatures is provided with sets of windings thereon, one of said sets being directly connected to a one side of a source of voltage and another of said sets being connected to the other side of a source of voltage.

7. An electric motor as recited in claim 6 further comprising control means including means for selectively reversing the polarity of said source of voltage to said sets of windings.

8. An electric motor as recited in claim 7 wherein said one armature is provided with a rotor shaft and potentiometer means connected to said shaft and being operatively connected with said control means to provide positional feedback signals thereto for modifying the magnitude of the source of voltage to said sets of windings.

* * * * *